(12) United States Patent
Ando et al.

(10) Patent No.: US 9,206,860 B2
(45) Date of Patent: Dec. 8, 2015

(54) CLUTCH PLATE AND METHOD OF PRODUCING SAME

(71) Applicants: JTEKT CORPORATION, Osaka (JP); NHK SPRING CO., LTD., Yokohama-shi (JP)

(72) Inventors: Hiroyuki Ando, Takahama (JP); Kunihiko Suzuki, Gamagori (JP); Junji Ando, Anjo (JP); Tatsuki Shimura, Otsu (JP)

(73) Assignees: JTEKT CORPORATION, Osaka-shi (JP); NHK SPRING CO., LTD., Yokohama-shi (JP)

( * ) Notice: Subject to any disclaimer, the term of this patent is extended or adjusted under 35 U.S.C. 154(b) by 128 days.

(21) Appl. No.: 13/744,970

(22) Filed: Jan. 18, 2013

(65) Prior Publication Data

US 2013/0186727 A1    Jul. 25, 2013

(30) Foreign Application Priority Data

Jan. 19, 2012   (JP) ................................. 2012-008965

(51) Int. Cl.
| | |
|---|---|
| *F16D 13/64* | (2006.01) |
| *B21D 53/16* | (2006.01) |
| *F16D 13/74* | (2006.01) |
| *F16D 27/115* | (2006.01) |
| *F16D 69/00* | (2006.01) |

(52) U.S. Cl.
CPC ............... *F16D 13/64* (2013.01); *B21D 53/16* (2013.01); *F16D 13/648* (2013.01); *F16D 13/74* (2013.01); *F16D 27/115* (2013.01); *F16D 2069/004* (2013.01)

(58) Field of Classification Search
USPC ..................................................... 192/113.36
See application file for complete search history.

(56) References Cited

U.S. PATENT DOCUMENTS

| | | | | | |
|---|---|---|---|---|---|
| 4,720,929 | A | * | 1/1988 | Umberson | ................. 192/70.12 |
| 4,995,500 | A | * | 2/1991 | Payvar | ....................... 192/107 R |
| 5,101,953 | A | * | 4/1992 | Payvar | ....................... 192/107 R |

(Continued)

FOREIGN PATENT DOCUMENTS

| | | |
|---|---|---|
| DE | 102 49 397 A1 | 4/2003 |
| DE | 10 2006 045 456 A1 | 4/2008 |

(Continued)

OTHER PUBLICATIONS

Translation JP 2006-029446 A , Jul. 9, 2014.*

(Continued)

*Primary Examiner* — Rodney H Bonck
(74) *Attorney, Agent, or Firm* — Oblon, McClelland, Maier & Neustadt, L.L.P.

(57) ABSTRACT

A clutch plate in an annular shape, the clutch plate includes: a plurality of lubricating grooves on one end face and the other end face of the clutch plate in an axial direction; and a plurality of windows passing through the clutch plate in the axial direction. The lubricating grooves are formed with plastic deformation, in a same phase on both the end faces, and extended up to outer peripheral edges and inner peripheral edges of both the end faces. A plurality of intersection points where the lubricating grooves intersect with each other are positioned in other areas than at least one of the outer peripheral edges, radially outer edges of the windows, radially inner edges of the windows, and the inner peripheral edges, of both the end faces.

8 Claims, 5 Drawing Sheets

(56) References Cited

U.S. PATENT DOCUMENTS

| | | | |
|---|---|---|---|
| 2002/0125096 A1* | 9/2002 | Yamazaki et al. | 192/84.91 |
| 2003/0106758 A1 | 6/2003 | Hirota et al. | |
| 2003/0106759 A1* | 6/2003 | Sakai | F16D 13/648 192/35 |
| 2007/0017773 A1* | 1/2007 | Suzuki et al. | 192/113.36 |
| 2010/0006388 A1* | 1/2010 | Fabricius et al. | 192/113.36 |

FOREIGN PATENT DOCUMENTS

| | | | |
|---|---|---|---|
| JP | 11-303911 | | 11/1999 |
| JP | 2002-213485 | | 7/2002 |
| JP | 2003-028218 | | 1/2003 |
| JP | 2006-029446 A | * | 2/2006 |

OTHER PUBLICATIONS

Extended European Search Report issued Apr. 16, 2013 in Patent Application No. 13151862.3.

U.S. Appl. No. 14/071,828, filed Nov. 5, 2013, Tusda.

Office Action issued Jul. 21, 2015 in Japanese Patent Application No. 2012-008965 w/English translation.

* cited by examiner

CLUTCH PLATE AND METHOD OF PRODUCING SAME

CROSS-REFERENCE TO RELATED APPLICATION(S)

This application is based upon and claims the benefit of priority from prior Japanese patent application No. 2012-008965, filed on Jan. 19, 2012, the entire contents of which are incorporated herein by reference.

BACKGROUND

The presently disclosed subject matter relates to a clutch plate and a method of producing the same.

There is a friction clutch which performs power transmission, by frictionally engaging a clutch plate at a driving side with a clutch plate at a driven side. Moreover, there is a friction clutch of electromagnetic type using a clutch plate which is provided with a plurality of windows in a shape of an arc-shaped through hole. The windows are required for forming a magnetic circuit. The friction clutch of the electromagnetic type is disclosed, for example, in JP-A-H11-303911.

Further, an electronically controlled 4WD coupling (ITCC (registered trade mark)) in which the electromagnetic friction clutch is used is disclosed, for example, in JP-A-2002-213485.

The clutch plate is provided with lubricating grooves for holding lubricating oil and for relieving the lubricating oil, on occasion of frictional engagement between the plates, on both end faces thereof in an axial direction. The lubricating grooves are extensively formed on sliding faces, and include a plurality of grooves. There are a plurality of intersection points where the grooves intersect with each other.

In forming the lubricating grooves, a method in which the lubricating grooves are formed with plastic deformation, in a same phase on both the end faces in the axial direction, is considered. According to this method, a flattening step can be omitted, because the lubricating grooves are formed in the same phase. Therefore, it is possible to produce the clutch plate by sequentially forwarding press work in which a groove pressing step, an extracting step, and so on are carried out in parallel at a time.

Specifically, the sequentially forwarding press work is to carry out a series of works which are performed through a provisional extracting step, a groove pressing step, and a shape extracting step on a sheet of magnetic metal plate M, in parallel at one press work, as shown in FIG. 8. According to the production method in which the sequentially forwarding press work is applied to production of the clutch plate, it becomes possible to reduce cost for the press work.

However, in case where the lubricating grooves are formed with the plastic deformation in the same phase on both the end faces in the axial direction, in the production process, bottom parts of the grooves are subjected to compression stress from both faces, and work-hardened. Those parts where the grooves are to be formed in edge parts of the clutch plate are likely to become fragile due to this work hardening. The stress is particularly concentrated on the intersection points where the grooves intersect with each other, and there is such anxiety that the edges of the clutch plate may be broken during the production. In case where the clutch plate is broken and a broken part remains in a stamping die, for example, there is such anxiety that a crack or a mark may occur at the next press work, and a life of the die may be deteriorated.

SUMMARY

The presently disclosed subject matter may provide a clutch plate and a method of producing the same in which occurrence of a crack is restrained, and capable of reducing a manufacturing cost.

The clutch plate in an annular shape may comprise: a plurality of lubricating grooves on one end face and the other end face of the clutch plate in an axial direction; and a plurality of windows passing through the clutch plate in the axial direction, wherein the lubricating grooves are formed with plastic deformation, in a same phase on both the end faces, and extended up to outer peripheral edges and inner peripheral edges of both the end faces, and a plurality of intersection points where the lubricating grooves intersect with each other are positioned in other areas than at least one of the outer peripheral edges, radially outer edges of the windows, radially inner edges of the windows, and the inner peripheral edges, of both the end faces.

The intersection points may be positioned in other areas than at least the outer peripheral edges of both the end faces.

The outer peripheral edges or the inner peripheral edges may be provided with splines, and the intersection points may be positioned in other areas than at least edges of the splines.

The intersection points may be positioned in other areas than the outer peripheral edges, the radially outer edges of the windows, the radially inner edges of the windows, and the inner peripheral edges, of both the end faces.

The clutch plate in an annular shape may comprise a plurality of lubricating grooves on one end face and the other end face of the clutch plate in an axial direction, wherein the lubricating grooves are formed with plastic deformation, in same phase on both the end faces, and extended up to outer peripheral edges and inner peripheral edges of both the end faces, and a plurality of intersection points where the lubricating grooves intersect with each other are positioned in other areas than at least one of the outer peripheral edges and the inner peripheral edges of both the end faces.

The intersection points may be positioned in other areas than at least the outer peripheral edges of both the end faces. The outer peripheral edges or the inner peripheral edges may be provided with splines, and the intersection points may be positioned in other areas than at least edges of the splines.

The intersection points may be positioned in other areas than the outer peripheral edges and the inner peripheral edges, of both the end faces.

The method of producing a clutch plate may comprise: forming a plurality of lubricating grooves on one end face and the other end face of the clutch plate in an axial direction by press work; and forming an outer shape of the clutch plate in an annular shape, the lubricating grooves being extended up to outer peripheral edges and inner peripheral edges of both the end faces, wherein the lubricating grooves are formed in a same phase on both the end faces, and a plurality of intersection points where the lubricating grooves intersect with each other are positioned in other areas than at least one of the outer peripheral edges, radially outer edges of a plurality of windows passing through the clutch plate in the axial direction, radially inner edges of the windows, and the inner peripheral edges, of both the end faces.

DETAILED DESCRIPTION OF EXEMPLARY EMBODIMENTS

Now, the presently disclosed subject matter will be described more specifically, referring to an embodiment. In the embodiment, a case where the clutch plate according to the presently disclosed subject matter is used as a clutch plate of a pilot clutch mechanism in an electronically controlled 4WD coupling (hereinafter referred to as a drive power transmitting device) is described by way of example.

(Drive Power Transmitting Device)

Figure 6:
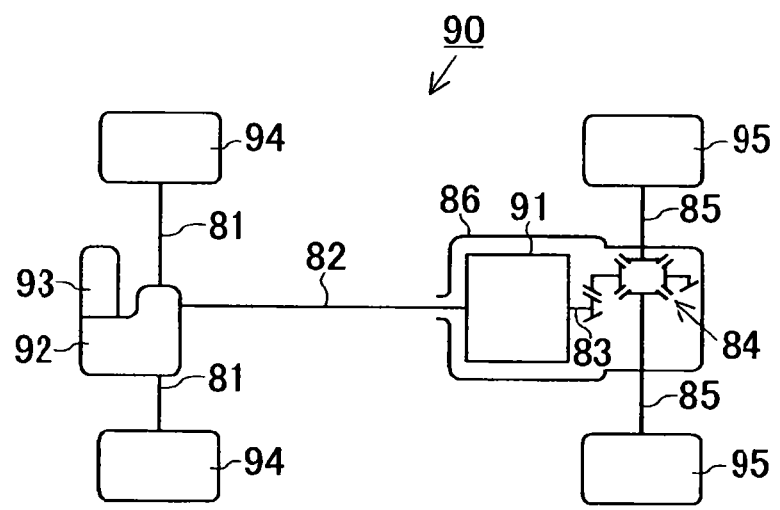
FIG. 6 is an explanatory view for explaining a four-wheel drive car.

Now, referring to FIGS. 6 and 7, a drive power transmitting device 91 will be described. To begin with, a four-wheel drive car 90 is mainly provided with the drive power transmitting device 91, a transaxle 92, an engine 93, a pair of front wheels 94, and a pair of rear wheels 95, as shown in FIG. 6. A drive power of the engine 93 is outputted to an axle shaft 81 by way of the transaxle 92, thereby to drive the front wheels 94.

The transaxle 92 is coupled to the drive power transmitting device 91 by way of a propeller shaft 82. The drive power transmitting device 91 is coupled to a rear differential 84 by way of a drive pinion shaft 83. The rear differential 84 is coupled to the rear wheels 95 by way of an axle shaft 85. In case where the propeller shaft 82 and the drive pinion shaft 83 are coupled by means of the drive power transmitting device 91 so as to transmit a torque, the drive power of the engine 93 is transmitted to the rear wheels 95.

The drive power transmitting device 91 is contained, for example, in a differential carrier 86, together with the rear differential 84. Moreover, the drive power transmitting device 91 is supported by the differential carrier 86, and supported by a vehicle body, by way of the differential carrier 86.

Figure 7:
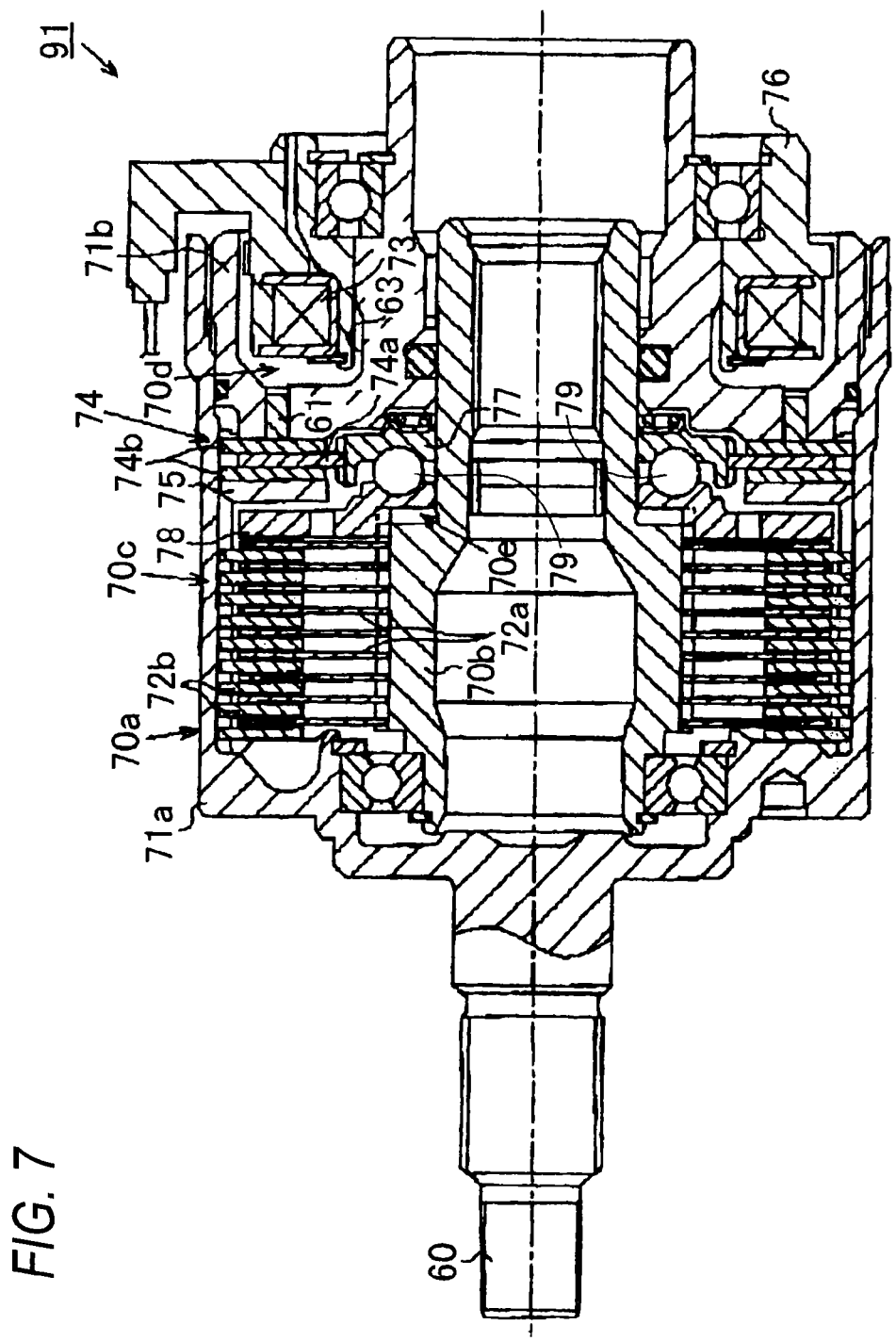
FIG. 7 is a fragmentary sectional view showing an electronically controlled 4WD coupling.

As shown in FIG. 7, the drive power transmitting device 91 includes, mainly, an outer case 70a as an outer rotation member, an inner shaft 70b as an inner rotation member, a main clutch mechanism 70c, a pilot clutch mechanism 70d, and a cam mechanism 70e.

The outer case 70a includes a front housing 71a in a shape of a bottomed cylinder, and a rear housing 71b which is screwed into a rear end opening of the front housing 71a thereby to close the rear end opening. An input shaft 60 is protruded from a front end of the front housing 71a, and this input shaft 60 is coupled to the propeller shaft 82.

The front housing 71a and the rear housing 71b in which the input shaft 60 is integrally formed are formed of iron, which is magnetic material. A tubular body 61 formed of stainless steel, which is non-magnetic material, is embedded in an intermediate part in a radial direction of the rear housing 71b. This tubular body 61 forms a non-magnetic part in an annular shape.

The outer case 70a is held so as to rotate with respect to the differential carrier 86 by means of bearings or the like (not shown), on an outer periphery of a front end of the front housing 71a. Moreover, the outer case 70a is held by a yoke 76 which is held with respect to the differential carrier 86, by means of bearings or the like, on an outer periphery of the rear housing 71b.

The inner shaft 70b is passed through a center part of the rear housing 71b in a liquid-sealed manner to be inserted into the front housing 71a. The inner shaft 70b is held so as to relatively rotate with respect to the front housing 71a and the rear housing 71b, in a state restrained from moving in an axial direction. A distal end of the drive pinion shaft 83 is inserted into the inner shaft 70b. It is to be noted that the drive pinion shaft 83 is not shown in FIG. 7.

The main clutch mechanism 70c is a clutch mechanism of a multi-plate type in a wet state, and includes a number of inner clutch plates 72a which are formed of iron and provided with paper abrasive material attached to sliding faces thereof, and a number of outer clutch plates 72b formed of iron. The inner clutch plates 72a and the outer clutch plates 72b are positioned at a rear wall side of the front housing 71a.

The inner clutch plates 72a in the clutch mechanism are assembled to an outer periphery of the inner shaft 70b by spline engagement so as to move in the axial direction. On the other hand, the outer clutch plates 72b are assembled to an inner periphery of the front housing 71a by spline engagement so as to move in the axial direction. The inner clutch plates 72a and the outer clutch plates 72b are arranged alternately in the axial direction, in such a manner that they can be contacted with each other in frictional engagement, and can be separated from each other into a free state of non-engagement.

The pilot clutch mechanism 70d includes an electromagnet 73, a friction clutch 74, and an armature 75. Electromagnetic driving means are composed of the electromagnet 73 and the armature 75.

The yoke 76 is held with respect to the differential carrier 86 in a spigot manner, and so held as to relatively rotate with respect to an outer periphery of a rear end part of the rear housing 71b. The electromagnet 73 in an annular shape is fitted to the yoke 76, and the electromagnet 73 is engaged with an annular recess 63 of the rear housing 71b.

The friction clutch 74 is formed as a friction clutch of multi-plate type including a sheet of inner pilot clutch plate 74a formed of iron, and two sheets of outer pilot clutch plates 74b formed of iron. In the below described embodiment, a case where the presently disclosed subject matter is applied to the inner pilot clutch plate 74a is described, as an example of the clutch plate according to the invention.

The inner pilot clutch plate 74a is assembled to an outer periphery of a first cam member 77 of the cam mechanism 70e by spline engagement so as to move in the axial direction. On the other hand, the respective outer pilot clutch plates 74b are assembled to the inner periphery of the front housing 71a by spline engagement so as to move in the axial direction.

The inner pilot clutch plate 74a and the respective outer pilot clutch plates 74b are arranged alternately in the axial direction, in such a manner that they can be contacted with each other in frictional engagement, and can be separated from each other into a free state of non-engagement.

A second cam member 78 is assembled to the outer periphery of the inner shaft 70b by spline engagement so as to move in the axial direction, in such a manner that it can be integrally rotated with the inner shaft 70b. The second cam member 78 is arranged so as to be opposed to the inner clutch plates 72a of the main clutch mechanism 70c. A cam follower 79 in a ball-like shape is interposed in a cam groove between the second cam member 78 and the first cam member 77 which are opposed to each other.

In the drive power transmitting device 91, while an electromagnetic coil of the electromagnet 73 in the pilot clutch mechanism 70d is not energized, a magnetic path is not formed, and the friction clutch 74 is in a non-engaged state. In this case, the pilot clutch mechanism 70d is not in operation, and the first cam member 77 in the cam mechanism 70e can be integrally rotated with the second cam member 78 by means of the cam follower 79. The main clutch mechanism 70c is not in operation, and therefore, the four-wheel drive car 90 is in a driving mode of two-wheel drive.

On the other hand, when the electromagnetic coil of the electromagnet 73 is energized, the magnetic path is formed in the pilot clutch mechanism 70d, and the electromagnet 73 attracts the armature 75. In this case, the armature 75 presses the friction clutch 74 into frictional engagement, and the first cam member 77 of the cam mechanism 70e is coupled to a side of the front housing 71a, thereby to cause a relative rotation with respect to the second cam member 78. As the results, in the cam mechanism 70e, the cam follower 79 presses the two cam members 77 and 78 in a direction of separating them from each other.

As the results, the second cam member 78 is pressed against the main clutch mechanism 70c thereby to bring the main clutch mechanism 70c into frictional engagement according to a frictional engaging force of the friction clutch 74. In this manner, torque transmission between the outer case 70a and the inner shaft 70b is performed. Accordingly, the four-wheel drive car 90 constitutes a driving mode of four-wheel drive in which the propeller shaft 82 is not directly coupled to the drive pinion shaft 83.

When an electric current to be inputted to the electromagnetic coil of the electromagnet 73 is enhanced to a predetermined value, an attraction force of the electromagnet 73 with respect to the armature 75 is increased. Then, the armature 75 is intensively attracted toward the electromagnet 73 thereby to increase the frictional engaging force of the friction clutch 74, and thus, relative rotation between the two cam members 77 and 78 is increased. As the results, a pressure of the cam follower 79 against the second cam member 78 is increased thereby to bring the main clutch mechanism 70c into a coupled state. Accordingly, the four-wheel drive car 90 constitutes a driving mode of four-wheel drive in which the propeller shaft 82 is directly coupled to the drive pinion shaft 83.

(Clutch Plate)

Now, the clutch plate 1 in this embodiment will be described referring to FIGS. 1 to 5. The clutch plate 1 which will be described below corresponds to the above described inner pilot clutch plate 74a.

Figure 1:
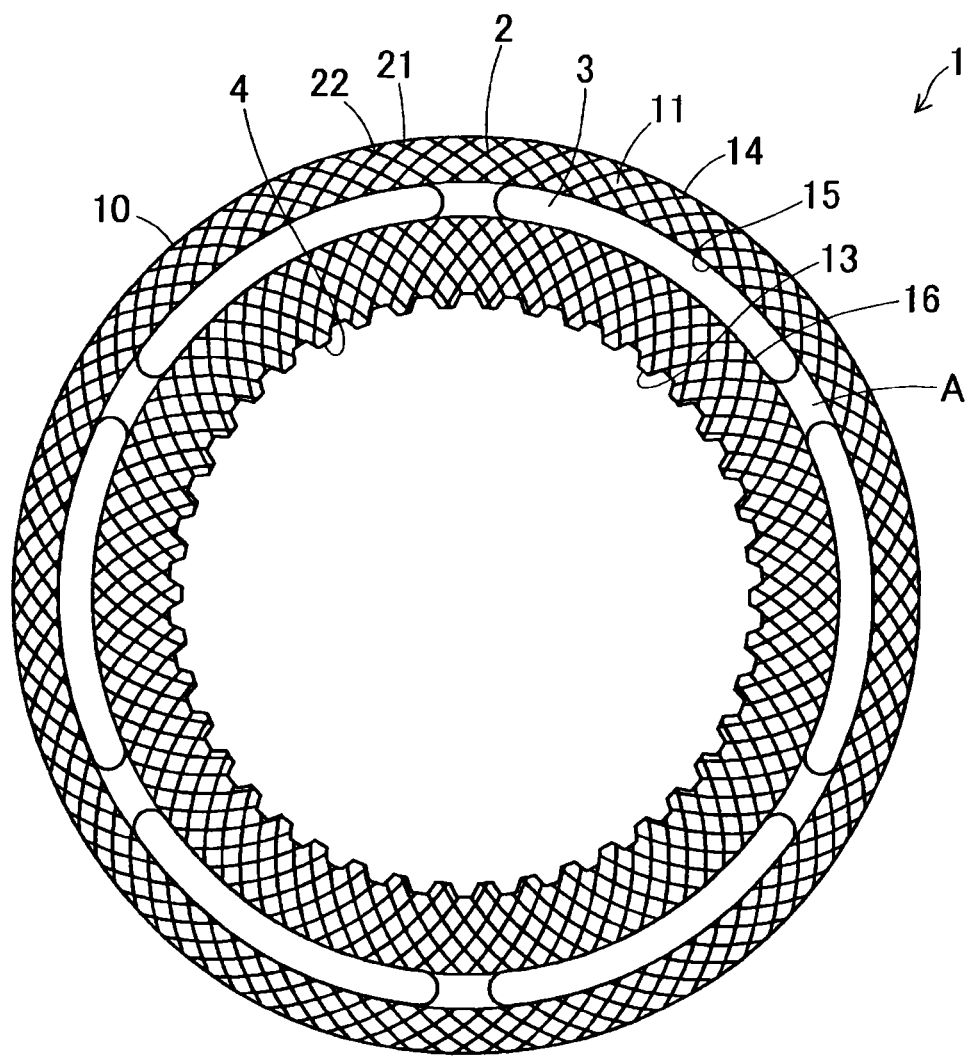
FIG. 1 is a front view showing a clutch plate 1 in an embodiment according to the presently disclosed subject matter.

As shown in FIG. 1, the clutch plate 1 in this embodiment is formed of a magnetic metal plate in an annular shape, and provided with lubricating grooves 2 on both end faces in the axial direction, namely, one end face 11 and the other end face 12. In short, the two end faces 11, 12 have the lubricating grooves 2, and frictional engaging faces (sliding faces) where the plates are frictionally engaged with each other. The lubricating grooves 2 are so formed as to receive superfluous lubricating oil which exists between the two pilot clutch plates 74a and 74b. The lubricating grooves 2 perform functions to receive the lubricating oil between the plates, and at the same time, to let the lubricating oil between the plates flow to the exterior. In this manner, mutual engagement between the two plates is smoothly performed.

Moreover, a plurality of windows 3 in a shape of an arc-shaped through hole passing through in the axial direction are arranged on a same circumference, in a substantially center part in a radial direction of the clutch plate 1 (on both the end faces 11, 12). The windows 3 are necessary for forming appropriate magnetic circuits (magnetic paths) in the pilot clutch mechanism. Moreover, splines 4 are formed on an inner peripheral edge 13 of the clutch plate 1. Specifically, the clutch plate 1 includes a base plate 10 in an annular shape, a plurality of the lubricating grooves 2 formed on both surfaces of the base plate 10, a plurality of the windows 3 formed in the base plate 10, and the splines 4 formed on the inner peripheral edge of the base plate 10. It is to be noted that the axial direction is a direction in which a center axis of the annular shape extends (a direction perpendicular to the drawing in FIG. 1), which is the axial direction of the input shaft 60.

Figure 2:
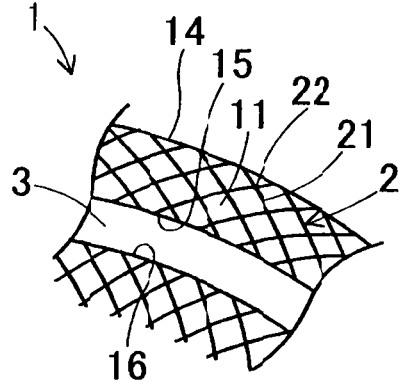
FIG. 2 is an enlarged view showing a part of the clutch plate 1 in the embodiment.

As shown in FIGS. 1 and 2, the lubricating grooves 2 include a plurality of grooves 21. The lubricating grooves 2 are extensively extended over both the end faces 11, 12 from an outer peripheral edge 14 up to the inner peripheral edge 13 (edges of the splines 4). More specifically, the lubricating grooves 2 are formed over the entire surfaces except the windows 3 and regions between the windows 3 (blank parts A). The lubricating grooves 2 include a plurality of intersection points 22 where the grooves 21 intersect with each other. In this embodiment, the points where the grooves 21 intersect with each other are the intersection points 22.

In this embodiment, the lubricating grooves 2 are formed in a shape of lattice (in a mesh-like shape). The grooves 21 which have a concave shape in section are extended from the outer peripheral edge 14 to radially outer edges 15 of the windows 3 or the blank parts A, at the outer peripheral side, and extended from radially inner edges 16 of the windows 3 or the blank parts A to the inner peripheral edge 13 (the edges of the splines 4), at the inner peripheral side. In short, the grooves 21 of the lubricating grooves 2 are extended in directions intersecting in a circumferential direction on both the end faces 11, 12.

Figure 4:
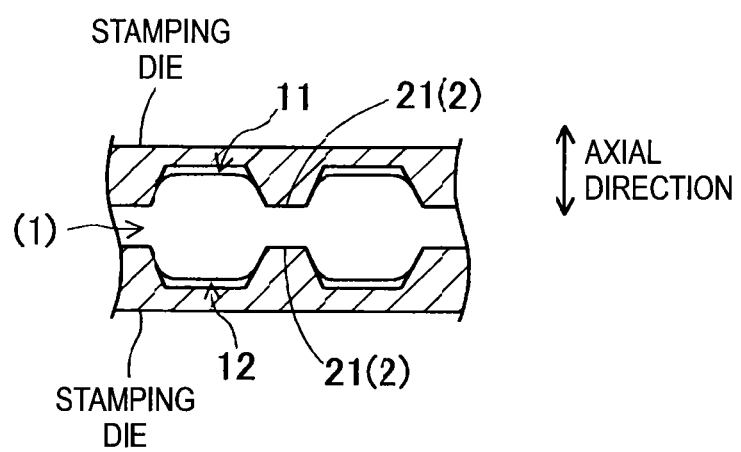
FIG. 4 is a schematic sectional view for explaining a method of producing the clutch plate 1 in the embodiment.

The lubricating grooves 2 are formed in a same phase on both the end faces 11, 12 (See FIG. 4). The same phase means that the grooves 21 are formed at the same positions on both the end faces 11 and 12, and further includes such a case that the grooves are first designed in the same phase, but consequently, displaced by an error or so. Specifically, the same phase in the presently disclosed subject matter includes not only a case where bottoms of the grooves 21 are completely overlapped, but a case where at least a part of the bottoms of the grooves 21 in a groove width direction on the corresponding end faces 11, 12 are overlapped in the axial direction over entire areas in a groove extending direction.

In this embodiment, all the intersection points 22 of the lubricating grooves 2 are positioned in other areas than the outer peripheral edge 14, the ladially outer edges 15 of the windows 3, and the radially inner edges 16 of the windows 3, on the respective end faces 11, 12. In short, the intersection points 22 are not present in the respective edges 14 to 16 over entire circumferences thereof. All the intersection points 22 are positioned on the surface areas of the two end faces 11, 12 except the edges 14 to 16.

(Method of Production)

Figure 3:
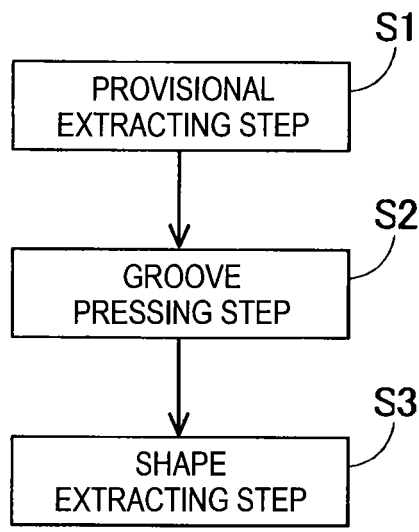
FIG. 3 is a flow chart showing production steps of the clutch plate 1 in the embodiment.

Now, an example of the production method of the clutch plate 1 will be described. The production method of the clutch plate 1 employs the press work, and includes, mainly, a provisional extracting step S1, a groove pressing step S2, and a shape extracting step S3, as shown in FIG. 3.

The provisional extracting step S1 is a step for pressing a magnetic metal plate to form rough shapes of the inner peripheral edge and the outer peripheral edge of the clutch plate 1. The groove pressing work S2 is a step for pressing the magnetic metal plate to form shapes of the lubricating grooves 2 on both the end faces 11, 12 in the same phase, as shown in FIG. 4. The shape extracting step S3 is a step for forming the inner peripheral edge 13 (the splines 4 in this embodiment), the outer peripheral edge 14, and the windows 3 of the clutch plate 1. It can be said that the provisional extracting step S1 and the shape extracting step S3 are the steps for forming the outer shape of the clutch plate 1 (corresponding to "the extracting step").

In this embodiment, in the groove pressing step S2, the lubricating grooves 2 are formed in such a manner that the intersection points 22 are positioned in other areas than the edges 14 to 16, on the respective end faces 11, 12. In short, stamping dies or the like are designed so that the intersection points 22 may not be formed in the edges 14 to 16, in the groove pressing step S2. In this manner, the clutch plate 1 in which the intersection points 22 are not present in the edges 14 to 16 is produced.

Figure 8:
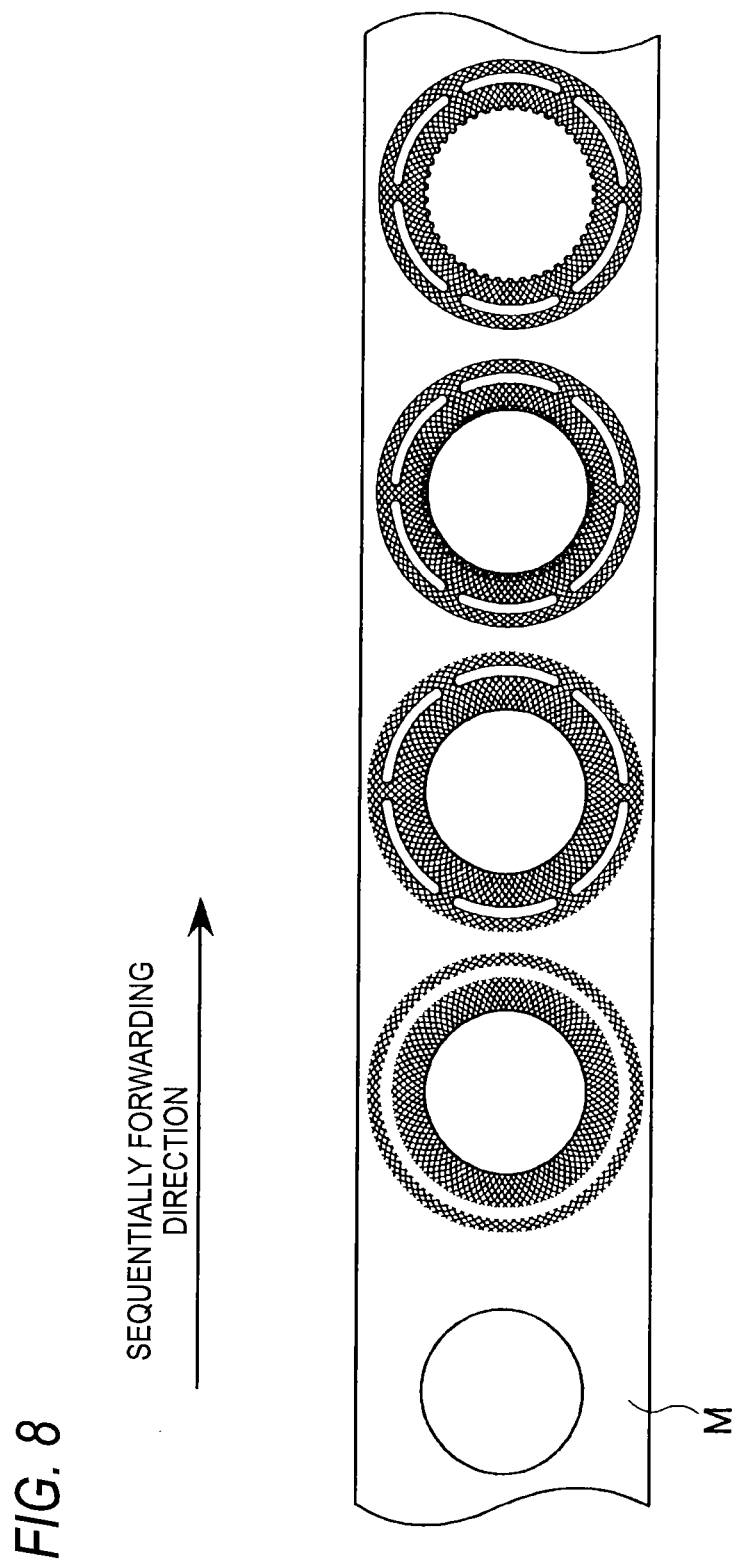
FIG. 8 is an explanatory view for explaining a sequentially forwarding press work.

In this method, a sequentially forwarding press work in which the provisional extracting step S1, the groove pressing step S2, and the shape extracting step S3 are carried out in parallel at one press work onto the magnetic metal plate M, as shown in FIG. 8, is employed. This can be realized by omitting a flattening step, because the lubricating grooves 2 are formed in the same phase on both the end faces 11, 12, in the groove pressing step S2. The flattening step is a step for flattening swells of the frictional engaging faces (sliding faces) which occur, after the grooves have been pressed with a large pressing force.

In the related-art method, the press works have been separately conducted in the respective steps, in order of the provisional extracting step, the groove pressing step, the flattening step, and the shape extracting step. The clutch plate has been produced using a plurality of press machines having different stamping dies and different pressing forces, for example, a press machine for conducting the provisional extracting step, a press machine for conducting the flattening step, and so on. Moreover, transfers between the respective press machines have been performed using a carriage or the like.

On the other hand, in this method, the provisional extracting step, the groove pressing step, and the shape extracting step are carried out on the magnetic metal plate M, in parallel at the same time at one press work, as described above. The magnetic metal plate M is sequentially forwarded, and the next press work is conducted. Therefore, the above described steps S1 to S3 can be carried out at one press work, using one press machine in which a plurality of stamping dies are arranged in parallel, for example. These steps S1 to S3 are carried out with the same pressing forces, and so, the working pressure is lowered. According to this method, it has become possible to employ the above described production method in which the lubricating grooves 2 are formed in the same phase, because occurrence of cracks can be restrained. Moreover, according to this method, it is possible to omit the transfer by carriage between the steps, and to restrain offset stamping, because the press work can be performed at the same time. According to this production method, various advantages such as decrease of the working pressure, reduction of cost for the press work, improvement of working efficiency, reduction of inspection cost, and so on can be achieved.

It is to be noted that after the groove pressing step S2, a lapping work (step) is appropriately conducted. The lapping work is a step for polishing the end faces 11, 12 thereby to enhance flatness of the frictional engaging faces.

According to the present method including the groove pressing step S2, the clutch plate 1 is so constructed that the intersection points 22 of the lubricating grooves 2 are not positioned in the edges 14 to 16 of both the end faces 11, 12. Because the edges 14 to 16 are free from the intersection points 22 on which stress tends to be concentrated, and which are likely to become fragile due to work hardening, occurrence of cracks in the edges 14 to 16 is restrained. Accordingly, inconveniences due to the cracks, for example, such troubles that a cracked part which remains in the stamping die causes a crack or a mark on the stamping die or the product, a shape of the next product is deformed, a life of the stamping die is shortened, etc. are prevented. As the results, it is possible for a manufacturer to adopt the production method which is performed at the low cost and with the high working efficiency.

The clutch plate 1 in this embodiment is applied to the drive power transmitting device which is provided with the main clutch mechanism for transmitting the torque by the frictional engagement between the outer clutch plate and the inner clutch plate, the pilot clutch mechanism including the outer pilot clutch plate, the inner pilot clutch plate, and the electromagnetic drive means for realizing the frictional engagement between the two pilot clutch plates, and the cam mechanism for transmitting the frictional engaging force of the pilot clutch mechanism to the main clutch mechanism thereby to achieve the frictional engagement between the clutch plates.

Modified Embodiment

The invention is not limited to the above described embodiment. For example, the intersection points 22 of the lubricating grooves 2 may be provided in other areas than at least one of the outer peripheral edge 14, the radially outer edges 15 of the windows 3, the radially inner edges 16 of the windows 3, and the inner peripheral edge 13, on the respective end faces 11, 12. In case where the intersection points 22 are not present in at least one of the edges, an effect of restraining cracks is exerted.

Figure 5:
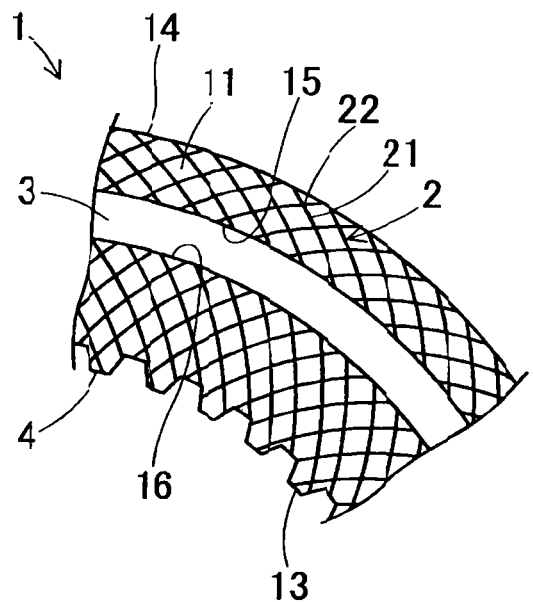
FIG. 5 is a front view showing a modification of the clutch plate 1 in the embodiment.

The effect of restraining cracks is further enhanced, by not forming the intersection points 22, particularly in the outer peripheral edge 14 where the intersection points 22 tend to increase in number, and in the edges of the splines 4 (the inner peripheral edge 13, in this embodiment) which have a complicated shape and are subjected to complicated stress during the production. The most effective structure is such a structure that the intersection points 22 are not present in all the edges 13 to 16 including the edges of the splines 4, as shown in FIG. 5.

The presently disclosed subject matter is also effective with respect to the clutch plate in which the windows 3 are not formed. For example, the clutch plate 1 may be applied to the clutch plates 72a, 72b of the main clutch mechanism 70a. In this case, the effect of restraining cracks is exerted, because the intersection points 22 are positioned in other areas than at least one of the outer peripheral edge 14 and the inner peripheral edge 13, respectively on both the end faces of the clutch plate. The effect of restraining cracks is further enhanced, by not providing the intersection points 22 in both the outer peripheral edge 14 and the inner peripheral edge 13, in the same manner as in this embodiment.

Moreover, the splines 4 need not be provided, or may be formed on the outer peripheral edge 14. For example, the clutch plate 1 may be applied to the outer pilot clutch plate 74b in which the splines are formed on the outer peripheral edge 14. Moreover, formation of the grooves 21 is not limited to the press work, provided that it is accompanied with plastic deformation. Moreover, work hardening can occur, even in such a method that the lubricating grooves 2 are not formed on both the end faces 11, 12 at the same time. Therefore, the presently disclosed subject matter is also advantageous to the other methods in which the lubricating grooves are not formed on both the end faces at the same time.

According to the presently disclosed subject matter, the intersection points of the lubricating grooves are not present in at least one of the outer peripheral edges, the radially outer edges of the windows, the radially inner edges of the windows, and the inner peripheral edges. Consequently, in the clutch plate in which the lubricating grooves are formed in the same phase on both the end faces, occurrence of cracks is restrained at least in the edges having no intersection point. As the results, it is possible to restrain occurrence of the cracks all over the clutch plate.

Moreover, the outer peripheral edges have the largest length in a circumferential direction, and in this area, cracks are relatively likely to occur, in case where the intersection points are present. According to such a structure that the intersection points are not present at least in the outer peripheral edges, occurrence of cracks is restrained at least in the outer peripheral edges. As the results, occurrence of the cracks as a whole is further restrained.

Moreover, there is also such a structure that the intersection points are not present at least in the edges of the splines. In an area having a complicated shape such as the splines, stress is not uniformly exerted during the production, and possibility of occurring cracks is enhanced. According to this structure, occurrence of the cracks is further restrained, because the intersection points are not present at least in the edges of the splines.

Moreover, there is such a structure that the intersection points are not present in all the edges of both the end faces. According to this structure, occurrence of the cracks is further restrained.

Moreover, there is such a structure that in the clutch plate having no window, the intersection points are not present in at least one of the outer peripheral edges and the inner peripheral edges. According to this structure, occurrence of the cracks is restrained.

Moreover, it is possible to form the clutch plate in such a manner that the intersection points are not present in at least one of the edges, in case where the lubricating grooves are formed with plastic deformation and in the same phase. As the results, occurrence of the cracks is restrained. Further, because the lubricating grooves are formed in the same phase, a flattening step can be omitted, and it becomes possible to produce the clutch plate by the sequentially forwarding press work.

What is claimed is:

1. A clutch plate in an annular shape, the clutch plate comprising:
   a plurality of lubricating grooves on one end face and the other end face of the clutch plate in an axial direction; and
   a plurality of windows provided radially between outer and inner peripheral edges of the end faces, the windows passing through the clutch plate in the axial direction, wherein
   the lubricating grooves are formed with plastic deformation, in a same phase on both the end faces, and extended up to the outer peripheral edges and inner peripheral edges of both the end faces, and
   a plurality of intersection points where the lubricating grooves intersect with each other are positioned only in other areas than radially outer edges of the windows and radially inner edges of the windows.

2. The clutch plate according to claim 1, wherein the intersection points are positioned only in other areas than at least the outer peripheral edges of both the end faces.

3. The clutch plate according to claim 1, wherein the outer peripheral edges or the inner peripheral edges are provided with splines, and the intersection points are positioned only in other areas than at least edges of the splines.

4. The clutch plate according to claim 1, wherein the intersection points are positioned only in other areas than the outer peripheral edges, the radially outer edges of the windows, the radially inner edges of the windows, and the inner peripheral edges, of both the end faces.

5. A clutch plate in an annular shape, the clutch plate having opposing end faces in an axial direction and comprising:
   a plurality of lubricating grooves provided on one end face of the clutch plate, and a plurality of lubricating grooves provided on the other end face of the clutch plate, the lubricating grooves on each of the end faces having the same phase, the lubricating grooves also forming a plurality of intersection points where two of the lubricating grooves intersect with each other;
   wherein, for each of the end faces of the clutch plate, the two lubricating grooves forming the intersecting points are formed with plastic deformation and extend to outer peripheral edges and inner peripheral edges of the end faces, and
   wherein the plurality of intersection points where the lubricating grooves intersect with each other are positioned only in other areas than at least one of the outer peripheral edges and the inner peripheral edges of both the end faces,
   wherein the outer peripheral edges or the inner peripheral edges are provided with splines, and the intersection points are positioned only in other areas than at least edges of the splines.

6. The clutch plate according to claim 5, wherein the intersection points are positioned only in other areas than at least the outer peripheral edges of both the end faces.

7. A clutch plate in an annular shape, the clutch plate having opposing end faces in an axial direction and comprising:
   a plurality of lubricating grooves provided on one end face of the clutch plate, and a plurality of lubricating grooves provided on the other end face of the clutch plate, the lubricating grooves on each of the end faces having the same phase, the lubricating grooves also forming a plurality of intersection points where two of the lubricating grooves intersect with each other;
   wherein, for each of the end faces of the clutch plate, the two lubricating grooves forming the intersecting points are formed with plastic deformation and extend to outer peripheral edges and inner peripheral edges of the end faces, and
   wherein the plurality of intersection points where the lubricating grooves intersect with each other are positioned only in other areas than at least one of the outer peripheral edges and the inner peripheral edges of both the end faces,
   wherein the intersection points are positioned only in other areas than the outer peripheral edges and the inner peripheral edges, of both the end faces.

8. A method of producing a clutch plate, the method comprising:

forming a plurality of lubricating grooves on one end face and the other end face of the clutch plate in an axial direction by press work;

forming an outer shape of the clutch plate in an annular shape, the lubricating grooves being extended up to outer peripheral edges and inner peripheral edges of both the end faces; and forming windows radially between the outer and inner peripheral edges of the end faces and passing through the clutch plate in the axial direction, wherein the step of forming a plurality of lubricating grooves includes forming the lubricating grooves in a same phase on both the end faces, and providing intersection points where the lubricating grooves intersect with each other only in other areas than radially outer edges of the windows and radially inner edges of the windows.

* * * * *